United States Patent [19]

Kenny et al.

[11] Patent Number: 4,725,937

[45] Date of Patent: Feb. 16, 1988

[54] LOW POWER DISSIPATION ANALOG CURRENT LOOP OUTPUT CIRCUIT

[75] Inventors: Thomas J. Kenny, Pittsburgh; James F. Sutherland, Plum Boro, both of Pa.

[73] Assignee: Westinghouse Electric Corp., Pittsburgh, Pa.

[21] Appl. No.: 926,806

[22] Filed: Oct. 30, 1986

Related U.S. Application Data

[63] Continuation-in-part of Ser. No. 689,734, Jan. 8, 1985, abandoned.

[51] Int. Cl.⁴ .......................................... H02M 3/335
[52] U.S. Cl. ........................................ 363/26; 363/56; 363/97; 363/134
[58] Field of Search ...................... 363/24, 25, 26, 56, 363/97, 131, 133, 134

[56] References Cited

U.S. PATENT DOCUMENTS

| | | | |
|---|---|---|---|
| 3,201,650 | 7/1965 | Schultz | 317/23 |
| 3,315,146 | 4/1967 | Paice . | |
| 3,426,263 | 2/1969 | Hennigan et al. | 320/23 |
| 3,453,525 | 7/1969 | Motta . | |
| 3,991,359 | 11/1976 | Thompson et al. | 323/4 |
| 4,045,887 | 9/1977 | Nowell | 361/98 |
| 4,203,141 | 5/1980 | Bishop et al. | 361/18 |
| 4,210,947 | 7/1980 | Koizumi | 361/18 |
| 4,264,950 | 4/1981 | Bockhorst et al. | 363/56 |
| 4,272,690 | 6/1981 | Riney et al. | 363/26 |
| 4,321,525 | 3/1982 | Imazeki et al. | 323/281 |
| 4,584,635 | 4/1986 | MacInnis et al. | 363/56 |
| 4,588,351 | 7/1986 | Fair et al. | 363/97 |
| 4,642,748 | 2/1987 | Kirk | 363/56 |
| 4,660,136 | 4/1987 | Montorefano | 363/97 |

OTHER PUBLICATIONS

A/D Visor published by National Semiconductor Corporation, Feb. 1984/vol. 4, No. 1, pp. 1-8.

*Primary Examiner*—Patrick R. Salce
*Assistant Examiner*—Anita M. Ault
*Attorney, Agent, or Firm*—D. C. Abeles

[57] ABSTRACT

A method and apparatus for controlling the magnitude of an analog current through a load to be proportional to the magnitude of an input voltage. A sensing resistor is connected in series with the load. A controllable voltage is applied across the series connection of the load and sensing resistor for driving a current therethrough. A pulse width modulator receives the input voltage and a feedback voltage corresponding to the voltage drop across the sensing resistors when current is conducted thereby and produces square wave pulses each having a pulse width which is adjusted in response to a difference between the magnitudes of the input voltage and the feedback voltage. The magnitude of the controllable voltage is adjusted as a function of the pulse width of the square wave pulses until the magnitude of the current flowing through the load and sensing resistor causes the magnitude of feedback voltage to correspond to the magnitude of the input voltage so that the current through the load is maintained proportional to the magnitude of the input voltage.

13 Claims, 4 Drawing Figures

LOW POWER DISSIPATION ANALOG CURRENT LOOP OUTPUT CIRCUIT

This application is a continuation-in-part of application Ser. No. 06/689,734 now abandoned filed Jan. 8, 1985.

BACKGROUND OF THE INVENTION

1. Field of the Invention:

The invention relates to a method and apparatus for controlling the magnitude of an analog current through a load impedance to be proportional to the magnitude of a voltage input signal.

2. Description of the Prior Art:

An analog current loop output circuit is typically used to monitor a process parameter such as a temperature or pressure in a controlled process. A conventional analog current loop output circuit includes a load impedance which may be, for example, the impedance of a strip chart recorder for recording a particular parameter. A power supply hving a fixed voltage drives a current through the load impedance. A linear current modulator is connected in the loop for controlling the magnitude of the current in the loop to be proportional to the magnitude of an input voltage which corresponds to the measured parameter. In its simplest form the linear current modulator may comprise a variable resistance which is controlled by the input voltage so that the current in the loop varies with the input voltage. Such conventional analog current loops are inherently inefficient because the load impedance dissipates 50% or less of the total power furnished by the power supply, with the remaining power being dissipated by the current modulator.

SUMMARY OF THE INVENTION

It is therefore an object of the present invention to increase the power efficiency of an analog current loop output circuit by reducing the power losses in the components of the loop output circuit external to the load impedance and by controlling the power supply to generate no more power than is necessary to drive the required loop current through the load impedance.

The above and other objects are accomplished in accordance with the invention by the provision of a method for controlling the magnitude of an analog current through a load to be proportional to the magnitude of an input voltage. The method includes connecting a sensing resistor in electrical series with the load; producing a controllable voltage across the series connection of the load and sensing resistor for driving a current through the load and the sensing resistor; providing a feedback voltage having a magnitude corresponding to the voltage drop across the sensing resistor when current is conducted thereby; producing periodic square wave pulses in response to the input voltage and adjusting the pulse width of each square wave pulse in response to a difference between the magnitudes of the input voltage and the feedback voltage; and adjusting the magnitude of the controllable voltage as a function of the pulse width of the square wave pulses until the magnitude of the current flowing through the load and the sensing resistor causes the magnitude of feedback voltage to correspond to the magnitude of the input voltage so that the current through the load is maintained proportional to the magnitude of the input voltage.

The invention further comprises a voltage regulated current supply arrangement for implementing the method according to the invention. The arrangement includes a sensing resistor connected in electrical series with the load. A controllable voltage supply means is connected for producing a controllable voltage across the series connection of the load and the sensing resistor for driving a current therethrough. A feedback means is connected for providing a feedback voltage corresponding to a voltage developed across the sensing resistor when current is conducted thereby. A square wave pulse means is provided which has a first input for receiving the input voltage, a second input for receiving the feedback voltage and an output means connected to the controllable voltage supply. The square wave pulse means is responsive to the input voltage for producing periodic square wave pulses at its output means and adjusts the pulse width of each square wave pulse in response to a difference between the magnitudes of the input voltage and the feedback voltage. The controllable voltage supply means is responsive to the square wave pulses for adjusting the magnitude of the controllable voltage in dependence of the pulse width of the square wave pulses until the magnitude of the current flowing through the load and the sensing resistor causes the magnitude of the feedback voltage to correspond to the magnitude of the input voltage so that the current through the load is maintained proportional to the magnitude of the input voltage.

A principal advantage of the method and apparatus according to the invention is that only the amount of voltage needed to drive the required current around the loop is produced by the voltage supply. Thus, at lower current levels and/or smaller resistive loads, the voltage magnitude of the variable voltage supply is proportionately reduced. This may be contrasted with the conventional current analog loop output circuit in which the magnitude of the fixed voltage supply is selected to sustain the highest current magnitude which is required by the loop at the largest expected load. When the current in the loop is reduced by the current modulator of the prior art circuit and/or when the load is reduced, the fixed voltage supply furnishes more power than is needed to drive the required current through the load, with the excess power being dissipated by the current modulator.

Further, in accordance with the invention the square wave pulse means is preferably implemented by a pulse width modulator in the form of an integrated circuit. Such an integrated circuit has relatively low power requirements and may be utilized in accordance with the invention to regulate the switching of power transistors which are connected in a push-pull arrangement for driving a current through the primary winding of a transformer, thereby inducing a secondary voltage in the secondary winding of the transformer. The secondary voltage is then rectified and utilized as the controllable voltage for driving the current through the analog current loop output circuit.

The total losses sustained by the voltage controlled analog current supply arrangement according to the invention are significantly less than the known analog current circuits utilizing a fixed voltage suply and a linear current modulator. Thus, less power is wasted by the arrangement according to the invention and a greater percentage of the power which is produced is utilized by the load rather than being dissipated by components of the circuit external to the load.

DESCRIPTION OF THE PREFERRED EMBODIMENT

Figure 1:
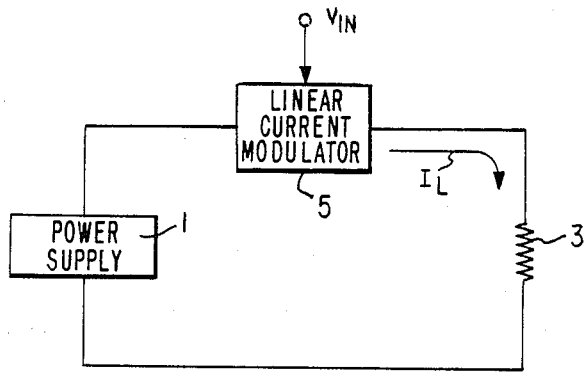
FIG. 1 is a block circuit diagram of an analog current loop output circuit in accordance with the prior art.

FIG. 1 illustrates a typical prior art analog current loop output circut in which a power supply 1 supplies power to a load 3 represented by a load resistance which for example may be the resistance presented by a strip chart recorder connected by recording a parameter such as temperature or pressure which is being measured in a controlled process. A linear current modulator 5 is connected in the loop between the power supply 1 and the load 3 for controlling the current $I_L$ in the loop. The current $I_L$ is controlled by the current modulator 5 to be proportional to an input voltage $V_{IN}$ which corresponds to the value of the measured parameter. In practice, voltage $V_{IN}$ is generally an externally generated demand voltage which is supplied from a source referenced to a ground potential. The maximum efficiency of the analog current loop illustrated in FIG. 1 is 50%, with 50% or more of the power supplied by power supply 1 being dissipated in current modulator 5. For example, assume that the input voltage $V_{IN}$ has a span 1 to 5 volts for controlling a current $I_L$ of 10 to 50 mA, with an input voltage $V_{IN}$ of 1 volt corresponding to a loop current $I_L$ of 10 mA and an input voltage $V_{IN}$ of 5 volts corresponding to a loop current $I_L$ equal to 50 mA. Further, assume that the load is set at 600 ohms and the power supply has a fixed voltage of 60 volts. If $V_{IN}$ equals 5 volts, thus regulating the loop current $I_L$ to 50 mA, 30 volts are dropped across the load which dissipates 1.5 watts. Since the power supply generates 3 watts of power (50 mA×60 volts), the remaining 1.5 watts are dissipated in a 30 volt drop across the current modulator for a maximum circuit efficiency of 50%.

If the input voltage $V_{IN}$ is 1 volt, causing the current modulator 5 to control the loop current to be 10 mA, the power furnished by power supply 1 is 0.6 watts (10 mA×60 volts), with 0.06 watts being dropped across the load and the remaining 0.54 watts being dropped across the current modulator 5. Thus, at this lower current level the efficiency of the circuit is 10%.

Further, because the load impedance may vary in a typical application from 0 to 600 ohms, it may be appreciated that the circuit efficiency will decrease in proportion to the reduction in the load resistance.

Figure 2:
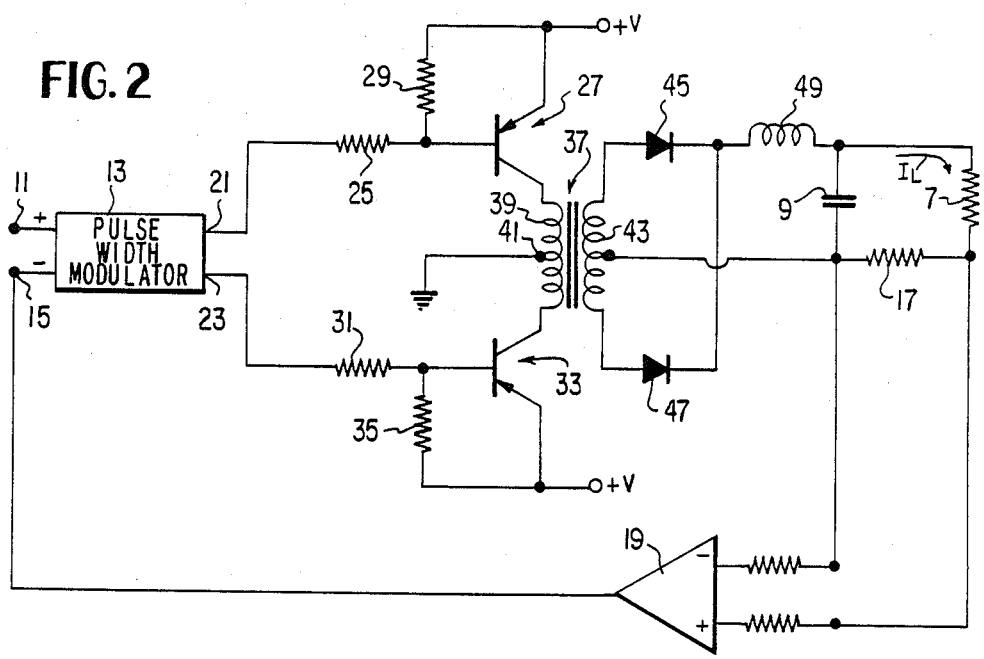
FIG. 2 is a circuit schematic showing an analog current loop output circuit in accordance with the invention.

FIG. 2 illustrates an analog current loop output circuit in accordance with the invention which has significantly better efficiency with regard to the percentage of power utilized by the load as compared with the prior art analog current loop output circuit illustrated in FIG. 1.

Referring to FIG. 2, a loop current $I_L$ is driven through a load 7 by a controllable d.c. voltage which is developed across a capacitor 9 by the circuitry to the left of capacitor 9 as shown in FIG. 2 and as will be described. As in FIG. 1, the intent is to control the loop current $I_L$ to be proportional to an externally generated input (demand) voltage $V_{IN}$, which in the circuit of FIG. 2, is applied to the positive input 11 of a pulse width modulator 13. Pulse width modulator 13 has a negative input 15 which receives a feedback voltage proportional to the voltage drop across a sensing resistor 17 which is connected in electrical series with load 7. Loop current $I_L$ thus passes through both the load 7 and sensing resistor 17, so that the voltage developed across sensing resistor 17 is proportional to the loop current $I_L$. Sensing resistor 17 is preferably a precison resistor of known value with a resistance substantially less than the resistance of load 7. A differential amplifer 19, having positive and negative inputs which are connected to terminals on either side of sensing resistor 17, develops an output voltage proportional to the voltage drop across sensing resistor 17. When the circuit of FIG. 2 is employed in an environment where there may be common mode effects and other sources of noise, amplifier 19 will preferably be an isolation type of amplifier of known design which will eliminate such noise.

Pulse width modulator 13 is responsive to the voltage input $V_{IN}$ and the feedback voltage for developing two trains of square wave pulses which appear at outputs 21 and 23, respectively. Output 21 is connected through a biasing resistor 25 to the base of a power transistor 27. The emitter and base of power transistor 27 are connected together via another biasing resistor 29. The emitter of power transistor 27 is also connected to a source of positive voltage. Similarly, the output 23 of pulse width modulator 13 is connected via a biasing resistor 31 to the base of a power transistor 33, and the emitter and base of power transistor 33 are connected together via a biasing resistor 35. The emitter of power transistor 33 is also connected to a source of positive voltage.

A step-up transformer 37 has a primary winding 39 which is connected between the respective collectors of power transistors 27 and 33. Primary winding 39 has a center tap 41 which is connected to ground. Transformer 37 has a secondary winding 43 which has its ends connected to the anodes of respective diodes 45 and 47. The cathodes of diodes 45 and 47 are connected together and via a smoothing choke 49 are connected to one plate of capacitor 9 and to load 7. The other plate of capacitor 9 is connected to the end of sensing resistor 17 which is remote from load 7. The secondary winding 43 of transformer 37 has a center tap which is connected to the common connection of capacitor 9 and sensing resistor 17 and which essentially serves as a floating ground for the current loop comprised of capacitor 9, load 7 and sensing resistor 17.

Pulse width modulator 13 is of a known type and is preferably in the form of an integrated circuit, such as the regulating pulse width modulator integrated circuit identified by Part No. LM3524 manufactured by the National Semiconductor Corporation or an equivalent integrated circuit. A pulse width modulator of this type produces two separate square wave pulse trains which have the same cycle period but which are offset in time relative to one another by one half the duration of the cycle period, the cycle period being set by an adjustable oscillator (not shown) which forms part of the circuitry of the integrated circuit chip. The pulse trains each have the same duty cycle, the duration of which is controlled by the differential input of the pulse width modulator to vary between 0 and close to 50% of the cycle period.

Figure 3A:
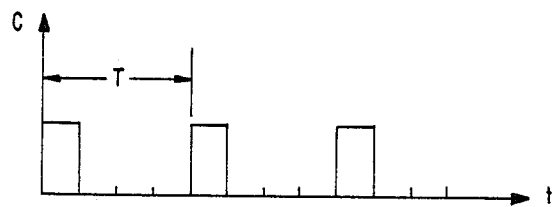
FIGS. 3a and 3b are signal diagrams relating to the operation of the circuit of FIG. 2.
Figure 3B:
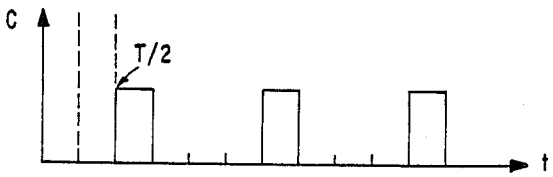

FIGS. 3A and 3B are signal diagrams which illustrate an example of the square wave current output pulses present at the outputs 21 and 23, respectively, of pulse width modulator 13 shown in FIG. 2. As discussed above, the pulse trains each have the same period T, but are offset relative to one another by T/2, the vertical hatch marks on the horizontal time axis being spaced by T/4. In this example the duty cycle of each pulse train is approximately 25% of T/4. The pulse width of the respective pulse train at pulse width modulator outputs 21 and 23 in FIG. 2 can be controlled by adjusting the magnitude of the input voltage applied to the positive terminal 11, in which case the feedback voltage applied to the negative terminal 15 causes the pulse width modulator to stabilize about a smaller or larger pulse width, depending upon whether the input voltage at terminal 11 is decreased or increased, respectively.

At a given magnitude of input voltage $V_{IN}$ at terminal 11, the pulse width modulator 13 will thus generate respective pulse trains at outputs 21 and 23 which cause power transistors 27 and 33 to switch on and off in a push-pull manner so as to generate current pulses in the respective halves of the primary winding of transformer 37. The resulting voltage induced across secondary winding 43 will depend upon the voltage magnitude of the positive voltage supply connected to the emitter terminals of the power transistors and the turns ratio of transformer 37. The induced secondary voltage is rectified by rectifiers 45 and 47 and the rectified voltage charges capacitor 9 via smoothing choke 49. When charged, capacitor 9 looks like a d.c. voltage souce to the series connection of the load 7 and the series sensing resistor 17. The d.c. voltage of charged capacitor 9 thus drives the loop current $I_L$ through both load 7 and sensing resistor 17. The voltage drop across sensing resistor 17 is thus proportional to the loop current $I_L$ and is fed back via amplifier 19 to the negative input of pulse width modulator 13. If the feedback voltage at negative terminal 15 is less than the input voltage $V_{IN}$, the pulse width modulator will operate to increase the duty cycle of the square wave pulses produced at its outputs 21 and 23, which increases the conduction time of the power transistors 27 and 33, which in turn results in a higher voltage being impressed across capacitor 9. The current $I_L$ is correspondingly increased until the feedback voltage equals the input voltage $V_{IN}$. If subsequently, the input voltage $V_{IN}$ is lowered so that the feedback voltage at negative terminal 15 is higher than the input voltage $V_{IN}$, the pulse width modulator 13 will operate to decrease at outputs 21 and 23 which correspondingly reduces the conduction time of power transistors 27 and 33, which in turn lowers the d.c. voltage magnitude developed across capacitor 9. Consequently, the current $I_L$ also decreases, which in turn decreases the voltage drop across sensing resistor 17 until the feedback voltage at the negative terminal 15 again equals the input voltage $V_{IN}$.

As a result of the foregoing operation, the loop current $I_L$ is constantly maintained proportional to the input voltage $V_{IN}$. Any change in the input voltage $V_{IN}$ results in a correspondingly proportional change in the curent $I_L$. The current $I_L$ is independent of any variations in the load 7. Moreover, because the value of the sensing resistor always corresponds directly to the magnitude of the loop current $I_L$.

Further, because the internal oscillator frequency of the pluse width modulator 13 is relatively high, in the KHz range, the response time of the circuit, that is the time it takes for the loop current to respond to a change in input voltage is very fast, on the order of milliseconds.

It has been found that the efficiency of the analog current loop output circuit of FIG. 2 significantly exceeds the efficiency of the known analog current loop output circuit shown in FIG. 1. A major factor contributing to the increased efficiency of the circuit according to the invention is that the voltage which drives the loop current $I_L$ is varied so that only the magnitude of direct voltage required for driving a current $I_L$ which is proportional to a given input voltage is developed across capacitor 9. Further efficiencies are realized by the nonlinear technique by which the power transistors 27 and 33 are switched on and off. That is, by adjusting the duty cycle of the square wave pulses produced by pulse width modulator 13 in direct correspondence to the desired loop current $I_L$, the total conductivity time of power transistors 27 and 33 also is a function of the desired loop current.

Further, because the pulse width modulator 13 is implemented in the form of an integrated circuit chip, an insignificant amount of power is lost in this portion of the circuit. The major source of power loss in the circuit of FIG. 2 is in the power transistors 27 and 33. However, since these transistors only dissipate power when they are turned on and each power transistor conducts less than 50% of the time, depending on the duty cycle of the square wave pulses, the power loss by these transistors 27 and 33 is minimized in accordance with the principles of the invention. Other areas of loss are in the transformer which in practice is not ideal and minor amounts of power are lost in the various biasing resistors and other electronic components. Overall it has been found that 65 to 70% of the power required by the circuit is utilized by load 7, as compared with a maximum of 50% in the prior art circuit of FIG. 1.

Moreover, by providing the output current loop with a floating common potential and by isolating the output current loop from the input circuitry via transformer 37 and isolation amplifier 19, abnormal common mode effects generated in the output current loop are prevented from disturbing the external demand signals.

According to a further aspect of the invention, means are provided for electronically switching on and off the operating power to pulse width modulator 13. Referring to FIG. 2, this accomplished, for example, by providing an electronic switch in the form of a pnp transistor 51 with its emitter connected to the operating power supply (+V), its collector connected to an operating voltage input terminal of pulse width modulator 13, and its base connected to a terminal 54 for receiving logic signals. A resistor 53 is connected between the emitter and base of transistor 51 whereby a low voltage logic signal at terminal 54 will close the collector-emitter path of transistor 53 and a high voltage logic signal at terminal 54 will open this collector-emitter path.

The provision of this electronic switch provides a fail safe back-up for bringing loop current $I_L$ to zero. That is, if pulse width modulator 13 malfunctions to cause a high loop current $I_L$ in the presence of a low or zero magnitude of the external demand voltage at terminal 11, this can be electronically sensed to produce a high voltage logic signal at terminal 54 to turn off transistor 51. Conversely, if transistor 51 is short-circuited in the on condition, the external demand voltage at terminal 11 can be reduced, thereby reducing the loop current $I_L$.

It will be understood that the above description of the present invention is susceptible to various modifications, changes and adaptations, and the same are intended to be comprehended within the meaning and range of equivalents of the appended claims.

We claim:

1. A method for controlling the magnitude of an analog current through a load to be proportional to the magnitude of an external demand voltage which is referenced to a ground potential, comprising:

providing an external demand voltage which is referenced to a ground potential;

connecting a sensing resistor in electrical series with the load;

producing a controllable d.c. voltage which is referenced to a floating common potential and applying the controllable d.c. voltage across the series connection of the load and sensing resistor for driving a current through the load and the sensing resistor;

providing a feedback voltage having a magnitude corresponding to a sensing voltage developed across the sensing resistor when current is conducted thereby;

electrically isolating the sensing voltage and the floating common potential from the feedback voltage and the ground potential of the extenal demand voltage, respectively;

producing periodic square wave pulses in response to the external damand voltage and adjusting the pulse width of each square wave pulse in response to a difference between the magnitudes of the external demand voltage and the feedback voltage; and adjusting the magnitude of the controllable voltage as a function of the pulse width of the square wave pulses until the magnitude of the current flowing through the load and the sensing resistor causes the magnitude of the feedback voltage to correspond to the magitude of the input voltage so that the current through the load is maintained proportional to the magnitude of the external demand voltage.

2. A method according to claim 1, wherein said step for producing the square wave pulses includes producing the square wave pulses with a regulating pulse width modulator in the form an integrated circuit.

3. A method according to claim 1, wherein said step of producing a controllable d.c. voltage includes providing a pair of power transistor connected for push-pull operation and a rectifier means connected for rectifying the output of the power transistors, and said step of adjusting the controllable d.c. voltage includes switching the power transistors on and off with the use of the square wave pulses, whereby the rectified output of the power transistors constitutes the controllable voltage.

4. A method according to claim 3, wherein the pulse width modulator is powered by an operating voltage and further including selectively controlling the pulse width modulator to be on or off by elctronically enabling and disabling the operating voltage.

5. A method according to claim 3, wherein said step of producing a controllable d.c. voltage includes providing a transformer having primary and secondary windings, connecting the primary winding to the pair of power transistors and connecting the secondary winding to the rectifier means.

6. A method according to claim 5, wherein said step of producing a controllable d.c. voltage includes forming a connection between a center tap of the secondary winding and a terminal of the sensing resistor remote from the load, the voltage at the center tap constituting said floating common potential.

7. A voltage regulated current supply arrangement for controlling the magnitude of a current through a load to be proportional to the magnitude of an externally generated demand voltage supplied from a source which is referenced to a group potential comprising:

a sensing resistor connected in electrical series with the load;

a controllable voltage supply means including output means having a floating common potential which is electrically isolated from the ground potential of the externally generated demand voltage, said output means being connected for producing a controllable voltage across the series connection of the load and said sensing resistor for driving a current through the load and said sensing resistor;

feedback means, including an isolation differential amplifier, connected to said sensing resistor for providing a feedback voltage corresponding to a sensing voltage developed across said sensing resistor when current is conducted by said sensing resistor, said isolating amplifier electrically mutually isolating the feedback voltage from the sensing voltage; and square wave pulse means having a first input for receiving the externally generated demand voltage, a second input for receiving the feedback voltage and an output connected to said controllable voltage supply means, said square wave pulse means being responsive to the externally generated demand voltage for producing periodic square wave pulses at the output of said square wave pulse means and adjusting the pulse width of each square wave pulse in response to a difference between the magnitudes of the externally generated demand voltage and the feedback voltage, said controllable voltage supply means being responsive to the square wave pulses for adjusting the magnitude of the controllable voltage in dependence of the pulse width of the square wave pulses until the magnitude of the current flowing through the load and said sensing resistor causes the magnitude of the feedback voltage to correspond to the magnitude of the externally generated demand voltage so that the current through the load is maintained proportional to the magnitude of the externally generated demand voltage.

8. An arrangement according to claim 7, wherein said square wave pulse means comprises a pulse width modulator in the form of an integrated circuit.

9. An arrangement according to claim 8, wherein said controllable voltage supply means includes two power transistors connected for push-pull operation, the switching of each said power transistor being controlled by a respective one of the pulse trains.

10. An arrangement according to claim 7, wherein said controllable voltage supply means further includes a transformer having a primary winding connected between said power transistors, a secondary winding, and rectifying means connected to said secondary winding, said power transistors being controlled by said pulse trains for causing a current to flow through said primary winding, inducing a secondary voltage across said secondary winding, the secondary voltage being rectified by said rectifying means to produce the controllable voltage.

11. An arrangement according to claim 10, wherein said secondary winding has a center tap connected to said sensing resistor at a terminal remote from the load, the voltage at said center tap constituting said floating common potential.

12. An arrangement according to claim 7, wherein the output of said square wave pulse means includes first and second outputs and said square wave pulse means produces a periodic square wave pulse train at each of said first and second outputs, respectively, the pulse trains having the same cycle period and being offset from one another in time by one half the cycle period.

13. An arrangement according to claim 7, and further comprising voltage supply means for supplying said square wave pulse means with an operating voltage and electronic switch means connected between said voltage supply means and said square wave pulse means for electronically selectively enabling and disabling the operating voltage supplied to said square wave pulse means.

* * * * *